United States Patent [19]

Stavenger et al.

[11] Patent Number: 4,737,541
[45] Date of Patent: Apr. 12, 1988

[54] THICKENING AGENTS FOR INDUSTRIAL FORMULATIONS

[75] Inventors: David L. Stavenger; James W. Sanner, both of Midland, Mich.; Patricia L. Slaber, Chicago, Ill.

[73] Assignee: The Dow Chemical Company, Midland, Mich.

[21] Appl. No.: 895,652

[22] Filed: Aug. 12, 1986

Related U.S. Application Data

[63] Continuation of Ser. No. 507,320, Jun. 23, 1983, abandoned.

[51] Int. Cl.$^4$ .................. C08J 41/00; C08L 39/00; C08L 23/04; C08F 275/00
[52] U.S. Cl. .................... 524/547; 524/460; 524/555; 524/320; 526/240; 526/287; 526/303.1
[58] Field of Search .............. 524/547, 555, 460; 526/287, 240, 303

[56] References Cited

U.S. PATENT DOCUMENTS

| | | | |
|---|---|---|---|
| 3,929,741 | 12/1975 | Laskey | 524/547 |
| 4,036,788 | 7/1977 | Steckler | 526/287 |
| 4,077,930 | 3/1978 | Lim et al. | 526/292.95 |
| 4,111,922 | 9/1978 | Beede et al. | 526/287 |
| 4,139,684 | 2/1979 | Coupek et al. | 526/287 |
| 4,147,681 | 4/1979 | Lim et al. | 526/292.95 |
| 4,305,860 | 12/1981 | Iovine et al. | 526/287 |
| 4,309,523 | 1/1982 | Engelhardt et al. | 526/240 |
| 4,544,719 | 10/1985 | Giddings et al. | 526/240 |
| 4,608,425 | 8/1986 | Peiffer et al. | 526/240 |
| 4,640,793 | 2/1987 | Persinski et al. | 524/547 |

FOREIGN PATENT DOCUMENTS 2077750 12/1981 United Kingdom ............... 524/555

Primary Examiner—Joseph L. Schofer
Assistant Examiner—Peter D. Mulcahy
Attorney, Agent, or Firm—Charles J. Enright

[57] ABSTRACT

Thickened or gelled industrial formulations comprise, for example, an aqueous acid or base formulation thickened with a small amount of a water-soluble polymer comprising acrylamide, an ionic monomer and, optionally, a crosslinking monomer. The thickened formulations can be used as industrial or household cleaners, etc., and exhibit good viscosity stability and retention capability over time.

23 Claims, No Drawings

THICKENING AGENTS FOR INDUSTRIAL FORMULATIONS

CROSS-REFERENCE TO RELATED APPLICATION

This is a continuation of application Ser. No. 507,320, filed June 23, 1983, now abandoned.

BACKGROUND OF THE INVENTION

This invention relates to formulations thickened with polymeric materials.

In industrial applications it is often necessary to employ acidic, basic or other highly reactive aqueous formulations wherein such active ingredients are employed, for example, as effective cleaners. Water-soluble and water-swellable organic thickeners can be incorporated into such formulations containing acidic, basic or other reactive species. The use of thickeners increases the retention of the liquid formulations onto the materials to which they are applied. This allows the active ingredient to be in contact with the material being treated for a relatively long period of time. In addition, a thickener can be employed to overcome problems associated with insufficient penetration of active ingredients to certain areas of the material.

Although polymeric thickening or viscosifying agents greatly enhance the retention capabilities and characteristics of reactive formulations, the addition of large amounts of polymer as is generally necessary in such formulations will lessen the reactive nature of the industrial formulation. In addition, poor thickening efficiencies are not cost effective. Furthermore, temperature changes which typically occur in industrial processes will affect the viscosity of a formulation containing a polymeric thickener. For example, as the temperature is increased the viscosity of the formulation will generally decrease. It is also possible for the reactive formulation to degrade the polymeric thickener at high temperatures or upon long storage times. The degradation of polymeric thickeners can lead to insoluble residues and is also undesirable because unthickened reactive ingredients can often leave undesirable residues which are difficult to remove.

In view of the deficiencies of the prior art, it would be highly desirable to provide a polymeric thickener for acidic, basic and other reactive industrial formulations which can provide good retention capability, exhibit good viscosity stability when contacted with said formulations, and exhibit high thickening efficiency.

SUMMARY OF THE INVENTION

In one aspect, the present invention is a thickened or gelled industrial formulation which comprises an industrial formulation thickened with a functionally effective amount of a water-soluble polymer comprising (1) a nonionic water-soluble ethylenically unsaturated monomer (2) a water-soluble ethylenically unsaturated monomer containing an ionic moiety and, optionally, (3) a polyvinyl crosslinking monomer; wherein said polymer is crosslinked in amounts sufficient to provide increased viscosity to the formulation and which amount of polymer is suffieient to thicken or to form a gelled formulation sufficient to maintain substantial viscosity stability and to achieve good retention capability of said formulation.

In another aspect, the present invention is a method for thickening industrial formulations, which comprises contacting a functionally effective amount of a water-soluble polymer comprising (1) a nonionic water-soluble ethylenically unsaturated monomer, (2) a water-soluble ethylenically unsaturated monomer containing an ionic moiety and, optionally, (3) a polyvinyl crosslinking monomer with an industrial formulation; said polymer, in the amounts used, being sufficiently compatible with the industrial formulation to permit increased viscosity to said formulation.

Surprisingly, the practice of this invention enables one to use small quantities of thickening polymer to achieve high viscosity formulations which exhibit good retention capability (i.e., the active ingredient of the industrial formulation is kept in a substantially constant contact with the surface to which it is applied) and good viscosity stability (i.e., the formulation maintains a substantially constant viscosity over time) even at the high temperatures reached while employing such formulations. In addition, the thickened formulations can be applied to vertical surfaces and do not exhibit substantial dripping or running over time.

The practice of this invention is found to successfully thicken a wide variety of industrial formulations. Of particular interest are acidic or basic systems such as metal cleaners, pickling baths, and other industrial cleaners.

DETAILED DESCRIPTION OF THE INVENTION

Ethylenically unsaturated water-soluble monomers suitable for use in this invention are those which are sufficiently water-soluble when dissolved in water and which readily undergo addition polymerization to form polymers which are at least inherently water-dispersible and preferably water-soluble. By "inherently water-dispersible" is meant that the polymer, when contacted with an aqueous medium, will disperse therein without the aid of surfactants to form a colloidal dispersion of the polymer in the aqueous medium.

Exemplary nonionic monomers suitably employed in the practice of this invention are those ethylenically unsaturated monomers that are sufficiently water-soluble to form at least a 5 weight percent solution when dissolved in water and readily undergo addition polymerization to form polymers that are water-soluble. Examples of such nonionic monomers include ethylenically unsaturated amides such as acrylamide, methacrylamide and fumaramide; their water-soluble N-substituted nonionic derivatives such as the N-methylol derivatives of acrylamide and methacrylamide as well as the N-methyl and N,N-dimethyl derivatives of acrylamide and methacrylamide; hydroxyalkyl esters of unsaturated carboxylic acids such as hydroxyethyl acrylate and hydroxypropyl acrylate; and the like. Of the foregoing nonionic monomers, the ethylenically unsaturated amides are preferred with acrylamide being especially preferred.

Suitable ethylenically unsaturated monomers containing ionic moieties include those which contain anionic moieties, which preferably include sulfonate-containing monomers. Examples of suitable water-soluble, ethylenically unsaturated sulfonate monomers include N-sulfoalkyl, α,β-ethylenically unsaturated amides such as 2-acrylamido-2-methylpropane sulfonic acid, 2-acrylamido propane sulfonic acid, 2-acrylamido ethane sulfonic acid and the alkali metal salts thereof such as the sodium and potassium salts thereof, as well as other such monomers listed in U.S. Pat. No. 3,692,673 which is hereby incorporated by reference; sulfoalkyl esters of unsaturated carboxylic acids such as 2-sulfoethyl methacrylate and other such sulfoalkyl esters as listed in U.S. Pat. No. 4,075,134 which is also incorporated by reference as well as the alkali metal salts thereof; sulfoarylalkenes such as vinylbenzyl sulfonic acid and the various salts of vinylbenzyl sulfonate, p-styrene sulfonic acid and the salts thereof; sulfoalkenes such as vinyl sulfonic acid and salts thereof; and the like. Of the foregoing sulfonate monomers, the sulfoalkyl derivatives of acrylamide and methacrylamide are preferred with those of acrylamide being especially preferred, particularly 2-acrylamido2-methylpropane sulfonic acid (AMPS), 2-acrylamido-2propane sulfonic acid and the salts thereof. In the most preferred embodiments, the sulfo group is in the form of an alkali metal sulfonate salt such as sodium sulfonate. Other anionic monomers such as acrylic acid, methacrylic acid or hydrolyzed acrylamide can also be employed.

Suitable ethylenically unsaturated monomers containing ionic moieties also include those which contain cationic moieties. Cationic polymers suitably employed in the practice of this invention are copolymers of the aforementioned nonionic monomers and ethylenically unsaturated monomers containing moieties such as the acryloylalkyl trialkyl ammonium salts (i.e., acryloylethyl trimethyl ammonium chloride); the methacryloylalkyl trialkyl ammonium salts (i.e., methacryloylethyl trimethyl ammonium chloride); the acrylamido- and methacrylamidoalkyl trialkyl ammonium salts (i.e., acrylamidopropyl trimethyl ammonium chloride and methacrylamidopropyl trimethyl ammonium chloride). Of the monomers containing cationic moieties, methacryloyl trimethyl ammonium chloride is most preferred.

The polyvinyl crosslinking monomers copolymerized with the aforementioned ethylenically unsaturated water-soluble monomers include, for example, divinyl benzene, divinyl esters of polycarboxylic acid, diallyl esters of polycarboxylic acids, diallyl maleate, diallyl fumarate, divinyl adipate, glyceryl trimethylacrylate, diallyl succinate, divinyl ether, the divinyl esters of ethylene glycol or diethylene glycol diacrylate, polyethylene glycol diacrylates or methacrylates, and the like. Of the aforementioned polyvinyl crosslinking monomers, the most preferred is methylene bisacrylamide.

Polymers are prepared by using techniques known in the art for preparing water-soluble polymers. For example, polymerization is preferably carried out in aqueous medium in the presence of a small but effective amount of a water-soluble oxygen-containing catalyst at a temperature of about 80° F. to about 190° F. The resulting polymer is recovered from the aqueous medium, as by precipitation or drum drying, and can be subsequently ground to the desired particle size. The particle size should be fine enough to facilitate the dispersion of the polymer in water. Polymers are also prepared, though much less preferably, using polymerization techniques described in U.S. Pat. No. 3,284,393; 4,376,850 and U.S. Pat. No. Re. 28,474, which are incorporated herein by reference.

Molecular weights of the polymers of this invention can vary. Molecular weights typically range from about 100,000 to about 25 million. Most preferably, molecular weights range from about 1 million to about 5 million.

The polymers of this invention comprise sufficient monomer containing ionic moieties in order that the formulation of this invention exhibits good heat stability at temperatures approaching 300° F., and does not yield an insoluble residue under conditions of conventional use of the formulation. The ionic moieties (particularly anionic moieties) present in the polymer also act to provide a polymer with a more workable (i.e., lower) viscosity than a polymer comprising large amounts of, for example, acrylamide. For example, a polymer containing 2-acrylamidopropane sulfonic acid provides particularly good solubility to the polymer at low pH. The polymers also comprise sufficient nonionic monomer, which is preferably acrylamide, in order that the polymer will provide sufficient thickening ability to the formulation. That is, such monomer typically provides high molecular weight and good viscosity to the polymer. The amount of polyvinyl crosslinking monomer which is employed will depend upon the type of crosslinker which is employed and the molecular weight of the polymer. The crosslinking monomer is employed to provide increased molecular weight and, hence, increased viscosity to the polymer. Thus, it is highly preferred to employ polymers comprising crosslinking monomers, as the thickening efficiency is increased.

The anionic polymers of this invention are typically 10 to about 80, preferably about 30 to about 70, most preferably about 40 to about 60, weight percent nonionic ethylenically unsaturated monomer, which is preferably acrylamide; from about 20 to about 90, preferably from about 30 to about 70, most preferably from about 40 to about 60, weight percent ethylenically unsaturated monomer containing anionic moieties, which is preferably 2-acrylamido-2-methyl propane sulfonic acid or a salt thereof; and from about 0 to about 1000 ppm, preferably from about 10 to about 100 ppm, most preferably from about 25 to about 75 ppm polyvinyl crosslinking monomer, which is preferably methylene bisacrylamide. It is understood that the amount of ethylenically unsaturated monomer containing anionic moieties within the polymer can vary depending on the anionic behavior of the monomer. It is also understood that the nonionic monomer within the polymer can undergo a small amount of hydrolysis. These polymers are particularly well suited for thickening acidic formulations and are most preferred.

The cationic polymers of this invention typically comprise from about 1 to about 80, preferably from about 1 to about 50, most preferably from about 5 to about 30, weight percent monomer containing a cationic moiety which is preferably methacryloylethyl trimethyl ammonium chloride, from about 20 to about 99, preferably from about 50 to about 99, most preferably from about 70 to about 95, weight percent nonionic monomer which is preferably acrylamide, and from about 0 to about 1000 ppm, preferably from about 10 to about 100 ppm, most preferably from about 25 to about 75 ppm polyvinyl crosslinking monomer which is preferably methylene bisacrylamide. These polymers can also undergo a small amount of hydrolysis.

The thickened formulations of this invention generally comprise from about 0.1 to about 5, preferably from about 0.5 to about 2, weight percent polymer, and from about 95 to about 99.9, preferably from about 98 to about 99.5, wieght percent aqueous formulations; based on the total weight of the formulation.

Small amounts of polymer incorporated into a formulation will usually produce mobile, thickened solutions which can be readily poured. Large amounts of polymer will usually produce thicker, more viscous, somewhat elastic gels. Gels having a viscosity "too thick to measure" by conventional methods can still be used in the practice of the invention. Thus, there is really no fixed upper limit on the amount of polymer which can be used so long as the gelled acidic formulation can be employed in accordance with the desired use. There can be a drop of viscosity of a formulation immediately after the initial addition of the polymeric thickener thereto. However, the formulation typically exhibits a substantially constant viscosity over time, thereafter. The preferred use of the industrial formulations is in the form of pourable products which allow for easier handling and yield nonsplattering formulations which exhibit good retention capabilities. For example, gels are more difficult to handle and remove than thickened aqueous solutions.

Acids useful in acid formulations used in the practice of this invention include, for example, inorganic acids such as hydrochloric acid, sulfuric acid, phosphoric acid, nitric acid and hydrofluoric acid; organic acids such as formic acid, acidic acid, propionic acid, butyric acid, citric acid, oxalic acid and mixtures thereof and combinations of inorganic and organic acids. The concentration or strength of the acid can vary depending upon the type of acid, the type of material being treated and the results desired in the particular application. Most preferably, the acid used in the practice of this invention is an inorganic acid such as hydrochloric acid. The concentration of the acid employed in the formulations thickened as described herein is not particularly critical, and good thickening can be achieved at high acid concentrations. Typically, however, for most industrial applications, the concentration is less than about 25, most preferably less than about 10, weight percent, based on the weight of aqueous solution and acid.

Bases useful in basic formulations include ammonia, sodium hydroxide and potassium hydroxide. As with the acidic formulations, the concentration or strength of the base which is employed can vary depending upon the type of base, the material being treated and the desired results.

The thickened formulations can also contain substantial amounts of brine. For example, good viscosity stability and retention capability can be obtained for those thickened industrial formulations containing in addition to other additives, sodium chloride, sodium bromide, magnesium chloride, calcium chloride and the like.

Most advantageously, the industrial formulations are aqueous liquids containing active ingredients common in the industry such as acids, bases or other highly reactive ingredients. Other additives common in the art, such as colorants, deodorants, etc., can also be incorporated therein. However, other industrial formulations can also be miscible with water and coupled into an organic solvent. Industrial formulations can be cleaners, disinfectants, paint removers, antioxidants and the like; for use on wood, tile, glass, metal, stone, porcelain, plastic, etc. It is understood that as used herein, the term "industrial formulations" is also intended to include those formulations that can be commercially available for household use. For example, such cleaners, disinfectants, etc., can be used for household use.

The following examples are intended to illustrate the invention and are not intended to limit the scope thereof. In the examples, all parts and percentages are by weight unless otherwise specified.

EXAMPLE 1

An acidic formulation is prepared by adding enough hydrochloric acid to deionized water to yield a 10 percent acid solution. To the solution is added enough polymer to yield a 1 percent thickened solution based on the total weight of the formulation. Formulations containing each polymer are designated as follows:

Sample No. 1 is thickened with a polymer comprising 80 percent 2-acrylamido-2-methylpropane sulfonic acid (AMPS) and 20 percent acrylamide.

Sample No. 2 is thickened with a polymer comprising 70 percent AMPS and 30 percent acrylamide.

Sample No. 3 is thickened with a polymer comprising 60 percent AMPS and 40 percent acrylamide.

Sample No. 4 is thickened with a polymer comprising 50 percent AMPS and 50 percent acrylamide.

Sample No. 5 is thickened with a polymer comprising 'percent AMPS and 60 percent acrylamide.

Each formulation is stored for a period of up to about 2.5 days at 20° C. The viscosity of each formulation is periodically measured using a Brookfield LVT viscometer, No. 2 spindle, at 12 rpm. Data is presented in Table I.

TABLE I

| | Viscosity (cps) at: | | | | | |
|---|---|---|---|---|---|---|
| Sample | 1 Day | 5 Days | 7 Days | 11 Days | 18 Days | 25 Days |
| 1 | 47.5 | 48.8 | 47.5 | 52.5 | 50 | 47.5 |
| 2 | 76.3 | 62.5 | 70 | 65 | 80 | 65 |
| 3 | 80 | 65 | 70 | 80 | 70 | 60 |
| 4 | 150 | 117.5 | 110 | 107.5 | 85 | 60 |
| 5 | 207.5 | 142.5 | 135 | 125 | 85 | 80 |

The data of Table I indicates that the thickened acidic formulations do not experience a significant loss of viscosity over time.

EXAMPLE 2

A thickened acid formulation is prepared as described in Example 1 except that the acid is phosphoric acid rather than hydrochloric acid. The formulations containing each polymer are designated as follows.

Sample No. 6 is thickened with a polymer comprising 80 AMPS and 20 percent acrylamide.

Sample No. 7 is thickened with a polymer comprising 70 percent AMPS and 30 percent acrylamide.

Sample No. 8 is thickened with a polymer comprising 60 percent AMPS and 40 percent acrylamide.

Sample No. 9 is thickened with a polymer comprising 50 percent AMPS and 50 percent acrylamide.

Sample No. 10 is thickened with a polymer comprising 40 percent AMPS and 60 percent acrylamide.

The viscosity of the formulation over time is measured as described in Example 1 and is illustrated in Table II.

TABLE II

| | Viscosity (cps) at: | | | | |
|---|---|---|---|---|---|
| Sample | 1 Day | 3 Days | 7 Days | 14 Days | 21 Days |
| 6 | 90 | 62.5 | 62.5 | 45 | 45 |
| 7 | 100 | 70 | 62.5 | 70 | 67.5 |
| 8 | 85 | 85 | — | 67.5 | 65 |
| 9 | 110 | 90 | 87.5 | 72.5 | 77.5 |
| 10 | 142.5 | 122.5 | 150 | 122.5 | 125 |

The data of Table II indicates that the thickened acidic formulations do not experience a significant loss of viscosity over time.

EXAMPLE 3

A thickened basic formulation is prepared as described in Example 1 except that a base is employed and is sodium hydroxide rather than hydrochloric acid. Formulations containing each polymer are designated as follows.

Sample No. 11 is thickened with a polymer comprising 70 percent AMPS and 30 percent acrylamide.

Sample No. 12 is thickened with a polymer comprising 40 percent AMPS and 60 percent acrylamide.

The viscosity of the basic formulation over time is measured as described in Example 1 and is illustrated in Table III.

TABLE III

| | Viscosity (cps) at: | | | | |
|---|---|---|---|---|---|
| Sample | 1 Day | 3 Days | 7 Days | 10 Days | 17 Days |
| 11 | 400 | 500 | 475 | 450 | 475 |
| 12 | 1115 | 1650 | 1587.5 | 1575 | 1625 |

The data of Table III indicates that the thickened basic formulations do not experience a significant loss of viscosity over time.

EXAMPLE 4

A thickened hydrochloric acid solution is prepared as described in Example 1. The formulations containing each polymer are designated as follows.

Sample No. 13 is 50 percent AMPS and 50 percent acrylamide.

Sample No. 14 is 50 percent AMPS, 50 percent acrylamide and 50 ppm methylene bisacrylamide.

The viscosity of each formulation over time as measured using the aforementioned viscometer but with a No. 1 spindle, and said viscosity is illustrated in Table IV.

TABLE IV

| | Viscosity (cps) at: | | |
|---|---|---|---|
| Sample | 1 Day | 7 Days | 21 Days |
| 13 | 140 | 135 | 80 |
| 14 | 290 | 275 | 200 |

The data of Table IV indicates that 50 ppm crosslinking monomer in the polymer greatly increases the viscosity of the formulation over that of noncrosslinked polymer. Also, good viscosity stability is observed.

EXAMPLE 5

A thickened sodium hydroxide solution is prepared as described in Example 3. The formulations containing each polymer are designated as follows.

Sample No. 15 is 40 percent AMPS and 60 percent acrylamide.

Sample No. 16 is 40 percent AMPS, 60 percent acrylamide and 50 ppm methylene bisacrylamide.

Sample No. 17 is 40 percent AMPS, 60 percent acrylamide and 100 ppm methylene bisacrylamide.

The viscosity of each formulation over time is illustrated in Table V.

TABLE V

| Sample | 1 Day | 7 Days | 14 Days |
|---|---|---|---|
| 15 | 1175 | 1637.5 | 2112.5 |
| 16 | 1187.5 | 1750 | 2550* |
| 17 | 1575 | 3200* | 3350* |

*Viscosity of samples is measured using the Brookfield LVT Viscometer with a No. 3 spindle. All other samples are measured with a No. 2 spindle.

The data of Table V indicates that the crosslinked polymers provide extremely high crosslinking efficiency to the formulation. The data also indicates extremely good viscosity stability over time.

EXAMPLE 6

A thickened phosphoric acid solution is prepared as described in Example 2. The formulations containing each polymer are designated as follows.

Sample No. 18 is 40 percent AMPS and 60 percent acrylamide.

Sample No. 19 is 40 percent AMPS, 60 percent acrylamide and 50 ppm methylene bisacrylamide.

Sample No. 20 is 40 percent AMPS, 60 percent acrylamide and 100 ppm methylene bisacrylamide.

The viscosity of each formulation over time is illustrated in Table VI.

TABLE VI

| Sample | 1 Day | 14 Days |
|---|---|---|
| 18 | 142.5 | 122.5 |
| 19 | 172.5 | 2850 |
| 20 | 2237.5 | 2287.5 |

The data of Table VI indicates that the crosslinked polymer provide extremely high thickening efficiency to the formulation and exhibits good viscosity stability over time.

What is claimed is:

1. A thickened or gelled reactive industrial formulation which comprises an industrial formulation thickened with a functionally effective amount of water-soluble polymer comprising in polymerized form (1) acrylamide or methacrylamide, (2) a water-soluble ethylenically unsaturated monomer selected from the group consisting of N-sulfoalkyl α, β-ethylenically unsaturated amides, sulfoalkyl esters of unsaturated carboxylic acids, sulfoarylalkenes, sulfoalkenes, salts thereof and mixtures of such monomers and (3) a polyvinyl crosslinking monomer, wherein said polymer is crosslinked in amounts sufficient to provide increased viscosity to the formulation, which amount of polymer is sufficient to thicken or form a gelled reactive formulation sufficient to maintain substantial viscosity stability and to achieve good retention capability of said formulation.

2. The formulation of claim 1 wherein said polymer comprises from about 10 to about 80 weight percent acrylamide, from about 20 to about 90 weight percent 2-acrylamide-2-propane sulfonic acid and from about 10 to about 100 parts per million methylene bisacrylamide crosslinking monomer.

3. The formulation of claim 2 which comprises from about 0.1 to about 5 weight percent polymer and from about 95 to about 99.9 weight percent aqueous formulation.

4. The formulation of claim 3 wherein said industrial formulation comprises an aqueous acid.

5. The formulation of claim 3 wherein said industrial formulation comprises an aqueous base.

6. The formulation of claim 3 wherein said industrial formulation comprises an aqueous base.

7. The formulation of claim 3 wherein said industrial formulation is a pourable, thickened aqueous solution.

8. The formulation of claim 3 wherein said industrial formulation is a disinfectant, a paint remover or an antioxidant.

9. The formulation of claim 3 wherein said polymer comprises from about 10 to about 30 weight percent acrylamide and from about 70 to about 90 percent 2-acrylamido-2-propane sulfonic acid.

10. A thickened or gelled reactive industrial formulation which comprises an industrial formulation thickened with a functionally effective amoutn of a water-soluble polymer comprising in polymerized form (1) acrylamide or methacrylamide and (2) a water-soluble ethylenically unsaturated monomer selected from the group consisting of N-sulfoalky $\alpha$, $\beta$-ethylenically unsaturated amides, sulfoalkyl esters of unsaturated carboxylic acids, sulfoarylaklenes, sulfoalkenes, salts thereof and mixtures of such monomers, which amount of polymer is sufficient to thicken or form a gelled reactive formulation sufficient to maintain substantial viscosity stability and to achieve good retention capability of said formulation.

11. The formulation of claim 10 wherein said monomer (1) is acrylamide and said monomer (2) is 2-acrylamido-2-propane sulfonic acid.

12. The formulation of claim 11 wherein said polymer comprises from about 10 to about 80 weight percent acrylamide and from about 20 to about 90 weight percent 2-acrylamido-2-propane sulfonic acid.

13. The formulation of claim 12 wherein said polymer comprises from about 10 to about 30 weight percent acrylamide and from about 70 to about 90 percent 2-acrylamido-2-propane sulfonic acid.

14. The formulation of claim 13 which comprises from about 0.1 to about 5 weight percent polymer and from about 95 to about 99.9 weight percent aqueous formulation.

15. The formulation of claim 14 wherein said industrial formulation comprises an aqueous acid.

16. The formulation of claim 14 wherein said industrial formulation comprises an aqueous base.

17. The formulation of claim 14 wherein said industrial formulation is an industrial cleaner.

18. The formulation of claim 14 wherein said industrial formulation is a pourable, thickened aqueous solution.

19. The formulation of claim 14 wherein said industrial formulation is a disinfectant, a paint remover or an antioxidant.

20. A method for thickening reactive industrial formulations which comprises contacting a functionally effective amount of a water-soluble polymer comprising in polymerized form (1) acrylamide or methacrylamide, (2) a water-soluble, ethylenically unsaturated monomer selected from the group consisting of N-sulfoalkyl $\alpha$, $\beta$-ethylenically unsaturated amides, sulfoalkyl esters of unsaturated carboxylic acids, sulfoarylalkenes, sulfoalkenes, salts thereof and mixtures of such monomers and (3) a polyvinyl crosslinking monomer with a reactive industrial formulation, said polymer in amounts used, being sufficiently compatible with the reactive industrial formulation to permit increased viscosity to and to maintain substantial viscosity stability of said formulation.

21. A method for thickening reactive industrial formulations which comprises contacting a functionally effective amount of a water-soluble polymer comprising in polymerized form (1) acrylamide or methacrylamide and (2) a water-soluble, ethylenically unsaturated monomer selected from the group consisting of N-sulfoalkyl $\alpha$, $\beta$-ethylenically unsaturated amides, sulfoalkyl esters of unsaturated carboxylic acids, sulfoarylalkenes, sulfoalkenes, salts thereof and mixtures of such monomers with a reactive industral formulation, said polymer in amounts used, being sufficiently compatible with the reactive industrial formulation to permit increased viscosity to and to maintain substantial viscosity stability of said formulation.

22. The method of claim 20 wherein said industrial formulation is an industrial cleaner.

23. The method of claim 21 wherein said industrial formulation is an industrial cleaner.

* * * * *

UNITED STATES PATENT AND TRADEMARK OFFICE
CERTIFICATE OF CORRECTION

PATENT NO. : 4,737,541

DATED : April 12, 1988

INVENTOR(S) : David L. Stavenger; James W. Sanner, both of Midland, Mich.; Patricia L. Slaber, Chicago, Ill.

It is certified that error appears in the above-identified patent and that said Letters Patent is hereby corrected as shown below:

Column 1, line 63, the word "suffieient" should be --sufficient--.

Column 3, line 14, the formula "2-acrylamido2-methylpropane" should read --2-acrylamido-2-methylpropane--.

Column 3, line 15, the formula "2-acrylamido-2propane" should read --2-acrylamido-2-propane--.

Column 4, line 28, the word "ahout" should be --about--.

Column 9, line 15, the word "amoutn" should be --amount--.

Column 9, line 19, the word "N-sulfoalky" should read --N-sulfoalkyl--.

Column 9, line 21, the word "sulfoaryleklenes" should be --sulfoarylalkenes--.

Column 10, line 35, the word "industral" should be --industrial--.

Signed and Sealed this

Twenty-eighth Day of February, 1989

Attest:

DONALD J. QUIGG

Attesting Officer

Commissioner of Patents and Trademarks